(12) United States Patent
McKay

(10) Patent No.: US 11,046,558 B2
(45) Date of Patent: Jun. 29, 2021

(54) CRANE ASSEMBLY

(71) Applicant: GLOBAL TRACK PTY LTD, Norlane (AU)

(72) Inventor: Douglas McGregor McKay, Zhejiang (CN)

(*) Notice: Subject to any disclaimer, the term of this patent is extended or adjusted under 35 U.S.C. 154(b) by 98 days.

(21) Appl. No.: 16/490,954

(22) PCT Filed: Mar. 6, 2018

(86) PCT No.: PCT/AU2018/050202
§ 371 (c)(1),
(2) Date: Sep. 4, 2019

(87) PCT Pub. No.: WO2018/161114
PCT Pub. Date: Sep. 13, 2018

(65) Prior Publication Data
US 2020/0010306 A1    Jan. 9, 2020

(30) Foreign Application Priority Data
Mar. 6, 2017    (CN) .......................... 201720207355.7

(51) Int. Cl.
*B66C 5/00* (2006.01)
*B66C 5/02* (2006.01)
(Continued)

(52) U.S. Cl.
CPC .................. *B66C 5/02* (2013.01); *B66C 9/08* (2013.01); *B66C 9/10* (2013.01); *B66C 9/16* (2013.01);
(Continued)

(58) Field of Classification Search
CPC ........... B66C 19/00; B66C 17/00; B66C 5/02; B66C 7/02; B66C 9/02; B66C 9/08; B66C 9/10; F16C 11/06; F16D 3/24
See application file for complete search history.

(56) References Cited

U.S. PATENT DOCUMENTS 4,635,802 A * 1/1987 Hylton .................... B66C 13/56
  212/285
4,730,743 A * 3/1988 Rosman .................. B66C 17/00
  212/312

(Continued)

FOREIGN PATENT DOCUMENTS

BE    893253 A    9/1982
RU    2026258 C1    1/1995

*Primary Examiner* — Emmanuel M Marcelo
(74) *Attorney, Agent, or Firm* — David Guerra

(57) ABSTRACT

The invention provides a crane assembly for lifting a load comprising: a pair of guides (2) positioned parallel to one another; a carriage (4,40) associated with each guide (2) and movable along each guide (2); a bridge (1) having an attachment point (8) for attaching the load, the bridge (1) being attached between the carriages (4,40) through connector arms (3), each connector arm (3) being attached through a lower end (31) to the bridge (1) and pivotable (5) at least about an axis perpendicular to the bridge, each connector arm (3) being attached at an upper end (32) to the corresponding carriage (4,40) through a multi-axis joint (33,35); wherein each multiaxis joint (33,35) is connected to the corresponding carriage (4,40) through a low friction thrust bearing (6) configured to rotate with initial movement of the corresponding carriage (4,40).

15 Claims, 2 Drawing Sheets

(51) Int. Cl.
  *B66C 9/08* (2006.01)
  *B66C 9/10* (2006.01)
  *B66C 9/16* (2006.01)
  *B66C 17/00* (2006.01)
  *B66C 19/00* (2006.01)
  *F16C 11/06* (2006.01)
  *F16D 3/16* (2006.01)

(52) U.S. Cl.
  CPC .............. *B66C 17/00* (2013.01); *B66C 19/00* (2013.01); *F16C 11/06* (2013.01); *F16D 3/16* (2013.01); *B66C 2700/03* (2013.01)

(56) References Cited

U.S. PATENT DOCUMENTS

| | | | | |
|---|---|---|---|---|
| 2004/0060886 A1* | 4/2004 | Windbergs | ................ | B66C 9/08 |
| | | | | 212/179 |
| 2004/0238473 A1* | 12/2004 | McKay | .................... | B66C 7/04 |
| | | | | 212/315 |
| 2007/0163982 A1* | 7/2007 | Lichinchi | ................ | B66C 19/02 |
| | | | | 212/175 |
| 2008/0110844 A1* | 5/2008 | Lewis | .................... | B66C 13/48 |
| | | | | 212/285 |
| 2009/0283490 A1* | 11/2009 | Givens | .................. | B25J 9/1065 |
| | | | | 212/317 |

* cited by examiner

CRANE ASSEMBLY

CROSS-REFERENCE TO RELATED APPLICATIONS

This application is an U.S. national phase application under 35 U.S.C. § 371 based upon co-pending International Application No. PCT/AU2018/050202 filed on Mar. 6, 2018. Additionally, this U.S. national phase application claims the benefit of priority of co-pending International Application No. PCT/AU2018/050202 filed on Mar. 6, 2018, and Australia Application No. 201720207355.7 filed on Mar. 6, 2017. The entire disclosures of the prior applications are incorporated herein by reference. The international application was published on Sep. 13, 2018 under Publication No. WO 2018/161114 A1.

FIELD

The invention relates to one kind of device, more specifically, a crane device that is manually moved.

BACKGROUND

Manually operable suspended crane assemblies such as a gantry crane or bridge crane are used in a great variety of industrial and other applications for lifting and moving loads. Such cranes typically suspend the load from a generally perpendicular bridge hanging perpendicularly between and movable along a pair of parallel guides. The suspension point of the load from the bridge may be movable by means of the suspension point being provided by a trolley movable along the bridge. Each end of the bridge it is connected to each guide rail through a carriage adapted to enable movement of the perpendicular bridge along the guide, which may be performed by a powered means or by manual pushing or pulling on one of the carriages by an operator from below with a rope or rod.

One problem with previous crane assemblies occurs when an operator attempts to initiate movement of the bridge in either direction relative to the guides. The effort required to initiate such movement is often considerable, at least in part owing to the fact that simultaneous movement of both carriages is usually required, although the force is directly applied by the operator only to one carriage. This applies a torque along the bridge tending to urge the bridge and carriages out of perpendicular alignment, increasing friction, which can ultimately cause jamming, preventing further movement.

In International patent application PCT/AU03/00668 the current inventor disclosed a solution to this problem. Both ends of the hanging bridge are connected to the respective carriage with a respective pivoting connector arm, which is configured to allow movement of the bridge out of the perpendicular at the commencement of motion. The connector arm is attached at a lower end to the bridge and pivotable at least about an axis perpendicular to the bridge. The connector arm is attached at an upper end to the carriage through a multi-axis pivoting joint such as a ball joint, comprising matching ball 44 and seat 46 spherical surfaces, in the reference signs of that application. The combination of the pivoting joints at the upper and lower ends allow the carriages to move sufficiently independently, with the pivoting of the connector arms at the lower and upper joints compensating for the required extra geometrical length of the bridge out of the perpendicular, and the angular deviation. This effectively removes the tendency of the carriages to jam and enables smooth initiation of movement. With the system disclosed in PCT/AU03/00668, about 10 kg force is required to initiate movement of a 1000 kg load.

The entire contents of International patent application PCT/AU03/00668 are incorporated herein by reference. Further improvements are described in PCT/AU2008/001731, the entire contents of which is also incorporated herein by reference.

The aforementioned system represents a considerable improvement over the rigid perpendicular bridges of the prior art. The inventor has now conceived of an improvement which enables even further reduction of the initiating force down to about 6 kg for a 1000 kg load.

SUMMARY OF THE INVENTION

The inventor has observed that static friction within the ball joint of the earlier invention is in practice a limiting factor in the initiation of movement, and has conceived of an improvement enabling even lower movement initiating force, while maintaining the advantages of the previously disclosed arrangement.

In accordance with a broad aspect of the invention, there is provided a crane assembly for lifting a load comprising:
 a pair of guides positioned parallel to one another;
 a carriage associated with each guide and movable along each guide;
 a bridge having an attachment point for attaching the load, the bridge being attached between the carriages through connector arms, each connector arm being attached through a lower end to the bridge and pivotable at least about an axis perpendicular to the bridge, each connector arm being attached at an upper end to the corresponding carriage through a multi-axis joint;
 wherein each multi-axis joint is connected to the corresponding carriage through a low friction thrust bearing configured to rotate with initial movement of the corresponding carriage.

In one embodiment, the multi-axis joint is a spherical joint, which may comprise matching first and second parts with spherical surfaces configured to slide over each other, the first part being connected to the connector arm and the second part being connected below the spherical surface of the second part to the carriage through the low friction thrust bearing. Each connector arm may be shaped like an arch; a top of the arch providing the upper end of the connector arm and comprising a through-hole; the first part of the corresponding multi-axis joint being located within the through-hole; and lower ends of sides of the arch being the lower end of the connector arm. The second part of the multi-axis joint may be configured to cooperate with a locating element on the carriage. The locating element may be a post of circular cross-section; the low friction thrust bearing may be annular in shape and located around a base of the post; and the second part of the multi-axis joint may be shaped to fit closely over the post and rotate around the post with rotation of the low friction thrust bearing. In one version, the spherical surface of the second part of the multi-axis joint is convex and the spherical surface of the first part of the multi-axis joint is concave.

In one embodiment, the low friction thrust bearing comprises rolling elements rolling between an upper and a lower race. The rolling elements may be needle rollers.

DETAILED DESCRIPTION OF EMBODIMENTS

The invention is described in detail in conjunction with the attached figures and specific embodiments.

Figure 1:
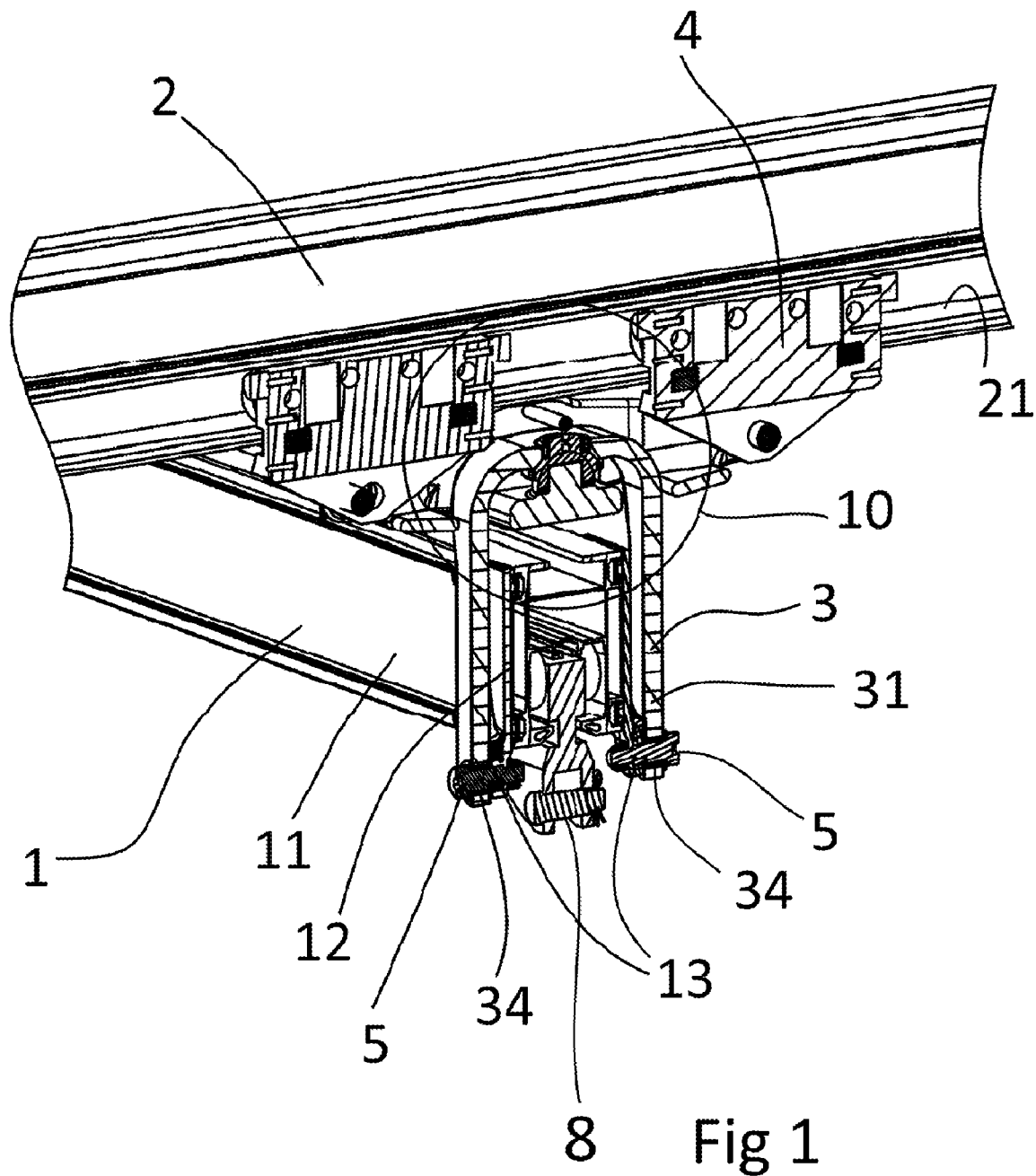
FIG. 1 is a schematic diagram of an embodiment of the invention.
Figure 2:
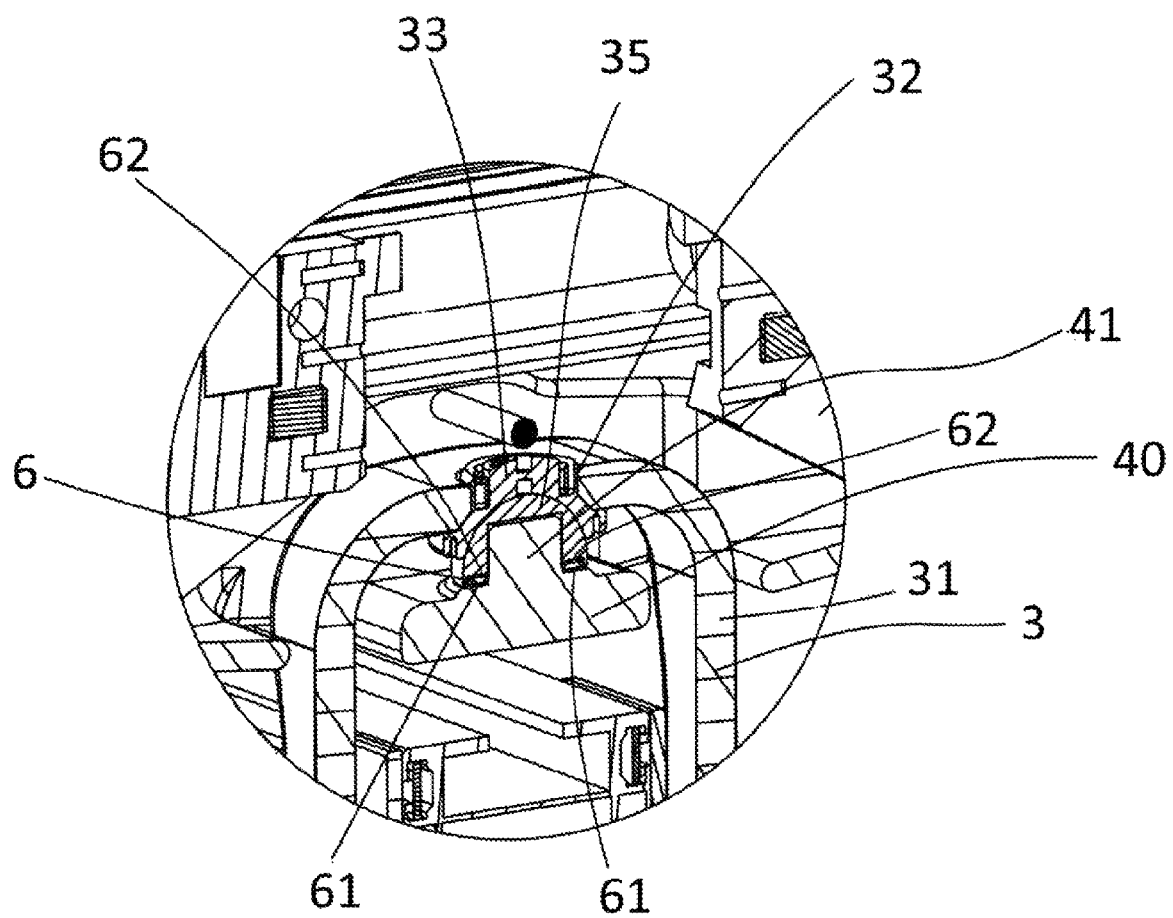
FIG. 2 is a local magnification of detail 10 of FIG. 1.

Referring now to FIGS. 1 and 2, the operation of the invention is illustrated by a truncated cut-through perspective view showing a cross-section through one of the carriages and a centre line of the connector arm. Further details of guides, carriages, bridges and other features are found in prior publications, including the previously published specifications PCT/AU03/00668 and PCT/AU2008/001731 of the inventor.

Referring now to FIGS. 1 and 2, the crane assembly comprises a bridge 1 hanging beneath between a pair of parallel guides 2 (only one of the guides being shown). The two ends of bridge 1 are each provided with a connector arm 3 respectively. Carriage 4 is configured to roll along a ledge 21 of guide 2. An opposing ledge is on the other side of guide 2 with a second set of rollers, not visible. Connector arm 3 is shaped like an arch with a top and sides, with lower ends of each arch side connected to bridge 1 through shafts 5 which are free to rotate about an axis perpendicular to bridge 1. The top of the arch of connector arm 3 is connected to a laterally projecting arm 40 of carriage 4 through a multi-axis joint 33,35 in the form of a spherical joint, and the multi-axis joint 33,35 is connected to projecting arm of carriage 4 carriage 4 through a low friction thrust bearing in the form of a needle roller thrust bearing to be described below. A trolley with a load attachment point 8 rolls along inner surfaces of bridge 1.

Laterally projecting arm 40 of the carriage 4 is provided with a post 41 of circular cross-section extending upwards from an upper surface thereof. Multi-axis joint comprising first part 33 and second part 35 connects connector arm 3 to carriage 4 through needle roller thrust bearing 6. First part 33 is constructed from plastic and is shaped to fit in through-hole 32 of the top of the arch of connector arm 3. Second part 35 is constructed from steel and is shaped with a cap-forming recess to fit closely over post 41 with a clearance of about 1 mm maintained by a flange going over the top of upper race 62. Post 41 and the cap-forming recess of second part 35 are heavily greased in the 1 mm gap to limit friction between post 41 and second part 35. A needle bearing or bush could alternatively be used between second part 35 and post 41 for the same purpose. First part 33 comprises a concave spherical surface on an underside, which cooperates with a convex spherical surface on an upper side of second part 35. First part 33 is held in contact with second part 35 by gravity and first and second parts 33 and 35 together form a spherical joint by mutual sliding of the concave and convex spherical surfaces, which tends to occur as the carriage is pulled by the operator out of perpendicular relation with bridge 1. Stationary lower race 61 of the needle roller thrust bearing 6 is set on the an outer raised base of post 41. Rotating upper race 62 of needle roller thrust bearing 6 engages with second part 35 of the multi-axis joint, allowing rotation of the second part 35 about a vertical axis through rolling of the needle rollers in needle roller thrust bearing 6 between lower race 61 and upper race 62.

Connector arm 3 has needle roller bearings extending through holes 34 in lower ends of sides 31 and holes 13 of side plates 12 of beam 11 of bridge 1, through which pass shoulder bolts 5, allowing connector arm 3 to pivot at its lower end about an axis perpendicular to bridge 1.

The provision of the low friction thrust bearing 6 enables improved initiation of movement of carriage 4, since rotation about the vertical axis, which is the primary initial movement of the connector arm 3 with respect to the carriage 4, is able to occur through the low friction thrust bearing 6 rather than having to occur via the higher-friction rotation of the multi-axis joint.

Persons skilled in the art will also appreciate that many variations may be made to the invention without departing from the scope of the invention, which is determined from the broadest scope and claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited in the claims are not necessarily intended to be performed temporally in the sequence written, or to be performed without pause once started, unless the context requires it.

In the claims which follow and in the preceding description of the invention, except where the context requires otherwise due to express language or necessary implication, the term "low friction thrust bearing" means a bearing adapted to rotate about an axis under low friction and adapted to support a load in the axial direction, with the low friction capability provided by rolling elements between two races, or non-rolling element bearings such as hydrostatic or magnetic bearings. Rolling element thrust bearings as are known in the art include thrust ball bearings, spherical roller thrust bearings, and needle roller thrust bearings.

In the claims which follow and in the preceding description of the invention, except where the context requires otherwise due to express language or necessary implication, the term "spherical surface" means a surface shaped as a part of a sphere.

In the claims which follow and in the preceding description of the invention, except where the context requires otherwise due to express language or necessary implication, the term "parallel" in respect of the guides includes pairs of guides which are curvilinear, and guides which are sufficiently parallel taking into account the compensating nature of the connecting arms of the invention.

In the claims which follow and in the preceding description of the invention, except where the context requires otherwise due to express language or necessary implication, the term "multi-axis joint" means a joint able to allow relative rotation of the joined elements around at least two axes, such as the spherical joint of the embodiment, but not necessarily restricted to spherical joints.

It is to be understood that, if any prior art publication is referred to herein, such reference does not constitute an admission that the publication forms a part of the common general knowledge in the art.

The invention claimed is:

1. A crane assembly for lifting a load comprising:
   a pair of guides positioned parallel to one another;
   a carriage associated with each guide and movable along each guide; and
   a bridge having an attachment point for attaching the load, the bridge being attached between the carriages through connector arms, each connector arm being attached through a lower end to the bridge and pivotable at least about an axis perpendicular to the bridge, each connector arm being attached at an upper end to the corresponding carriage through a multi-axis joint;

wherein each multi-axis joint is a spherical joint and is connected to the corresponding carriage through a thrust bearing configured to rotate with initial movement of the corresponding carriage;

wherein the multi-axis joint comprises matching first and second parts with spherical surfaces configured to slide over each other, the first part being connected to the connector arm and the second part being connected below the spherical surface of the second part to the carriage through the thrust bearing;

wherein: each connector arm is shaped like an arch; a top of the arch provides the upper end of the connector arm and comprises a through-hole; the first part of the corresponding multi-axis joint is located within the through-hole; and lower ends of sides of the arch being the lower end of the connector arm;

wherein the second part of the multi-axis joint is configured to cooperate with a locating element on the carriage;

wherein the locating element is a post of circular cross-section; the thrust bearing is annular in shape and is located around a base of the post and the second part of the multi-axis joint is shaped to fit closely over the post and rotate around the post with rotation of the thrust bearing.

2. The crane assembly of claim 1, wherein the spherical surface of the second part of the multi-axis joint is convex and the spherical surface of the first part of the multi-axis joint is concave.

3. The crane assembly of any one of claim 2, wherein the thrust bearing comprises rolling elements rolling between an upper and a lower race.

4. The crane assembly of claim 3, wherein the rolling elements are needle rollers.

5. The crane assembly of claim 3, wherein the lower race is stationary and is set on an outer raised base of the post, and the upper race is rotatably engageable with the second part of the multi-axis spherical joint, the upper race is configured for rotation of the second part about a vertical axis through rolling of the thrust bearing between the lower race and the upper race.

6. The crane assembly of claim 3, wherein the second part is configured with a cap-forming recess to fit over the post in a spaced apart relationship maintained by a flange going over a top of the upper race.

7. The crane assembly of claim 1, wherein the connector arm has roller bearings extending through holes defined in lower ends of side plates of a beam of the bridge, through which pass members configured to allow the connector arm to pivot at its lower end about an axis perpendicular to the bridge.

8. A crane assembly for lifting a load comprising:
a pair of guides positioned parallel to one another;
a carriage associated with each of the guides and movable along each of the guides, respectively;
a bridge having an attachment point for attaching the load, the bridge being attached between the carriage of each of the guides through one or more connector arms, each of the connector arms being attached through a lower end to the bridge and pivotable at least about an axis perpendicular to the bridge; and
a multi-axis spherical joint configured to attach an upper end of each of the connector arms to the corresponding carriage utilizing a low friction thrust bearing configured to rotate with initial movement of the corresponding carriage, the multi-axis spherical joint including matching first and second parts with spherical surfaces configured to slide over each other, the first part being connected to the connector arm and the second part being connected below the spherical surface of the second part to the carriage through the low friction thrust bearing;
wherein the second part of the multi-axis spherical joint is configured to cooperate with a locating element on the carriage, the locating element being a post of circular cross-section;
wherein the low friction thrust bearing being annular in shape and being located around a base of the post; and
wherein the second part of the multi-axis spherical joint being shaped to fit over the post and rotate around the post with rotation of the low friction thrust bearing.

9. The crane assembly of claim 8, wherein each connector arm is shaped like an arch, a top of the arch provides the upper end of the connector arm and comprises a through-hole; wherein the first part of the corresponding multi-axis spherical joint is located within the through-hole; and lower ends of sides of the arch being the lower end of the connector arm.

10. The crane assembly of claim 8, wherein the low friction thrust bearing comprises rolling elements rolling between an upper and a lower race.

11. The crane assembly of claim 10, wherein the rolling elements are needle rollers.

12. The crane assembly of claim 10, wherein the lower race is stationary and is set on an outer raised base of the post.

13. The crane assembly of claim 12, wherein the upper race is rotatably engageable with the second part of the multi-axis spherical joint, the upper race is configured for rotation of the second part about a vertical axis through rolling of the thrust bearing between the lower race and the upper race.

14. The crane assembly of claim 10, wherein the second part is configured with a cap-forming recess to fit over the post in a spaced apart relationship maintained by a flange going over a top of the upper race.

15. The crane assembly of claim 8, wherein the connector arm has roller bearings extending through holes defined in lower ends of side plates of a beam of the bridge, through which pass members configured to allow the connector arm to pivot at its lower end about an axis perpendicular to the bridge.

* * * * *